(12) United States Patent
Morris

(10) Patent No.: US 6,618,907 B2
(45) Date of Patent: Sep. 16, 2003

(54) SAFETY HAT FASTENERS FOR EYE GLASSES

(75) Inventor: Russell Earl Morris, 650 Crescent Blvd, South West Calgary, Alberta T2S 1L2 (CA)

(73) Assignee: Russell Earl Morris, Calagary (CA)

( * ) Notice: Subject to any disclaimer, the term of this patent is extended or adjusted under 35 U.S.C. 154(b) by 0 days.

(21) Appl. No.: 09/952,580

(22) Filed: Sep. 14, 2001

(65) Prior Publication Data

US 2002/0069489 A1 Jun. 13, 2002

Related U.S. Application Data

(63) Continuation-in-part of application No. 09/733,125, filed on Dec. 8, 2000, now Pat. No. 6,481,059.

(51) Int. Cl.[7] .............................................. A44B 21/00
(52) U.S. Cl. ........................... 24/3.3; 24/3.12; 24/458; 24/564
(58) Field of Search .................... 24/3.3, 3.11, 3.12, 24/3.1, 336, 545, 546, 555–557, 560–563, 458, 564; 2/10; 351/155

(56) References Cited

U.S. PATENT DOCUMENTS

| | | | | |
|---|---|---|---|---|
| 3,137,005 A | * | 6/1964 | Herbine et al. | 2/10 |
| 3,273,163 A | * | 9/1966 | Andrews, III | 2/422 |
| 4,768,231 A | * | 9/1988 | Schrack | 2/13 |
| 4,796,308 A | * | 1/1989 | Bourgeois | 2/10 |
| 5,066,154 A | * | 11/1991 | Renaud | 24/10 R |
| 5,123,724 A | | 6/1992 | Salk | 351/57 |
| 5,845,369 A | | 12/1998 | Dunchock | 24/3.3 |
| 5,903,928 A | * | 5/1999 | Hyung-Seob | 2/115 |
| 5,940,890 A | * | 8/1999 | Dallas et al. | 2/421 |
| 5,940,891 A | * | 8/1999 | Lane | 2/10 |
| 6,185,748 B1 | * | 2/2001 | DeChambeau | 2/195.1 |
| 6,210,003 B1 | * | 4/2001 | Chan | 24/3.3 |

FOREIGN PATENT DOCUMENTS

JP      8-260217    * 8/1996

* cited by examiner

Primary Examiner—James R. Brittain
(74) Attorney, Agent, or Firm—Wendy Buskop; Buskop Law Group, P.C.

(57) ABSTRACT

Safety glasses holders and eye glass holders for securing to safety hats or fabric comprising a clip on design and a nonremovable fastening design, wherein the fastening design in one embodiment comprises a removeable frame secured to the sides of a safety hat; and in the second embodiment, a nonremoveable design which may be either a first and second elastic cord or pin penetrating the hat and secured to the frame, and a strip disposed between the first and second elastic cords or pins for holding the arm of a pair of safety glasses or, in a second embodiment of the permanently fixed holder, comprises a planar member attached to the safety hat by a spring which serves to hold the clip in place and provide a securing force to engage the arm of a pair of eyeglasses between the clip and safety hat.

2 Claims, 10 Drawing Sheets

Top View

Top View

View of outer face    View of inner face

View of outer face	View of inner face

SAFETY HAT FASTENERS FOR EYE GLASSES

The present application is a continuation-in-part application, which claims priority to application Ser. No. 09/733,125, filed in the U.S. Patent and Trademark Office on Dec. 8, 2000, now U.S. Pat. No. 6,481,059 herein incorporated by reference.

FIELD OF THE INVENTION

The present invention relates to eyeglass holders and, in particular, safety glass holders, sunglass holders and clear eyeglass holders adapted to secure to a hat or clothing of a user.

BACKGROUND OF THE INVENTION

Safety is a paramount issue in refineries and chemical plants, oil field rig sites or other industrial sites. Most plants require their employees to wear safety glasses during work time, particularly if they are outside of a building. Problems have developed in where to put safety glasses, when not in use, while keeping them handy for instantaneous use. The present invention has been created to save the eyes and health of the many refinery and chemical plant workers, other heavy industry workers and also has use in the recreational sports area.

Millions of people wear eyeglasses and sunglasses everyday. However, many of them remove their eyeglasses during the course of the day for various reasons, when they come inside from the sun, when they enter a tunnel, or come into a dark place. In some cases, individuals remove their eyeglasses to perform other activities because they need glasses only to read, and not see distance. In each case, the user requires a place to hold or store the eyeglasses when they are not used.

While safety glasses are very bulky and difficult to store, normal sunglass cases are commonly available, as are chains or strings, which move about the head or neck of a user and hold the eyeglasses when they are removed from the user's head. As chains are fully functional to store or hold eyeglasses when not in use, they frequently suffer from practical or aesthetic shortcomings that limit their use. Also, glasses of any sort worn by a rope or chain around the neck present a choking hazard from the rope or chain as well as a puncture hazard into the persons body should they fall on or press hard against the glasses hanging about their neck during a sporting or work activity. Safety glasses are usually too heavy to be supported by such strings particularly of the safety glasses are prescription glasses. Various improvisations may be made to hold and support eyeglasses when not in use, though they frequently suffer from an inability to secure the glasses, or are aesthetically undesirable to trendy users.

The present invention addresses these and other deficiencies associated with the problems of holding safety glasses on an employee's person yet keeping the glasses really handy for instantaneous use in case of a chemical excursion or other problems, which does not enable an employee time to get the glasses out of a case or other container. In addition, the present invention provides a strong support, which is trending for contemporary eye glass and sunglass users. The present invention provides two versions of a device for securing eyeglasses against dislodgment by an active user, while providing an aesthetically pleasing construction that can appear as an ornamental feature for a hat or article of clothing.

When in use, the construction of the present invention allows the glass holder to serve its intended function, without detracting from the appearance of the hat to which it is attached. More specifically, the present invention is directed to an eyeglass holder which, when in use, distributes the load of the glasses over a broader area of a hat to avoid or mitigate the eyeglasses from weighting the hat in an unbalanced manner.

These and other advantages of the invention are described in more detail below in conjunction with the presently preferred embodiment of the invention.

SUMMARY OF THE INVENTION

A safety glasses or similar eye glass holder is disclosed for personal use which is attachable to an individual's hat or an article of fabric, or clothing, for supporting and securing a pair of safety glasses, sun glasses or similar eye glasses. The holder preferably comprises a clip or fastener having one of two fundamental designs, which is engageable with a hat or fabric or an article of clothing. The holder extends from the hat and is in one version is removably affixed to the hat, and in another version is permanently affixed to the hat. In each case, the holders engage the arm of the safety or eyeglasses.

The eye glass fastener, for the removable version designed for supporting and securing a pair of safety glasses, sunglasses or similar eyeglasses is designed specifically for attachment to an individuals safety hat. The clip is preferably formed as a substantially planar circular, rectangular or triangular member, with a curvature similar to that of the safety hat and fabricated of resilient plastic material or lightweight metal alloy, a composite, a laminate or combinations thereof. The current design is manufactured through a "two shot injection molded" process that provides both grip and pressure resilience to hold the eyeglasses between the clip and the safety hat. The fastener has a thickness of approximately one-third inch. In the presently preferred embodiment the clip formed to have a height of approximately one and one half to two inches long and is preferably one and one half to two inches long.

Either of the two versions of the eye glass fastener may be formed from plastic, a light weight metal alloy or be a laminated material and which has a thickness of between about 0.01 to about 0.5 inches. In a preferred embodiment the fasteners are made from material that is approximately 0.05 inches thick or thicker.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth functions and construction of the invention in connection with the illustrated embodiment. It is to be understood, however, that the same or equivalent functions may be accomplished by different embodiments that are also intended to be accomplished within the spirit and scope of the invention.

The present invention involves two basic fastening designs, the hardhat clip design, and the fastened holder design. Both can be used with safety glasses and attachable to soft hats or hard hats for making safety glasses easily and instantaneously available thereby preventing injury to an employee.

Figure 1:
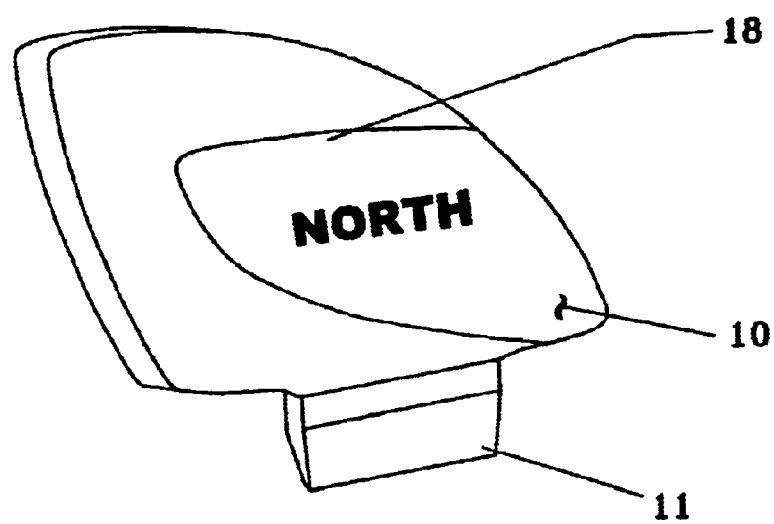
FIGS. 1 and 1A are perspective views showing the clip embodiments alone.
Figure 2:
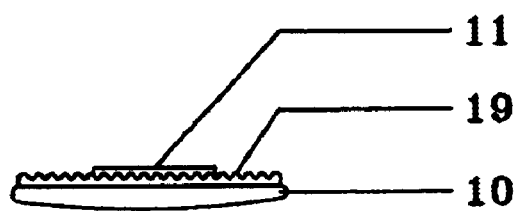
FIGS. 2 and 2A are top views of the constructions shown in FIGS. 1 and 1A.
Figure 3:
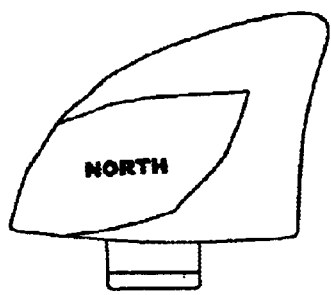
FIGS. 3 and 3A are side views of both sides of the constructions shown in FIGS. 1 and 1A.
Figure 3:
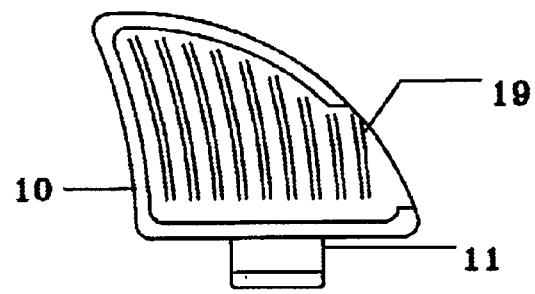
Figure 4:
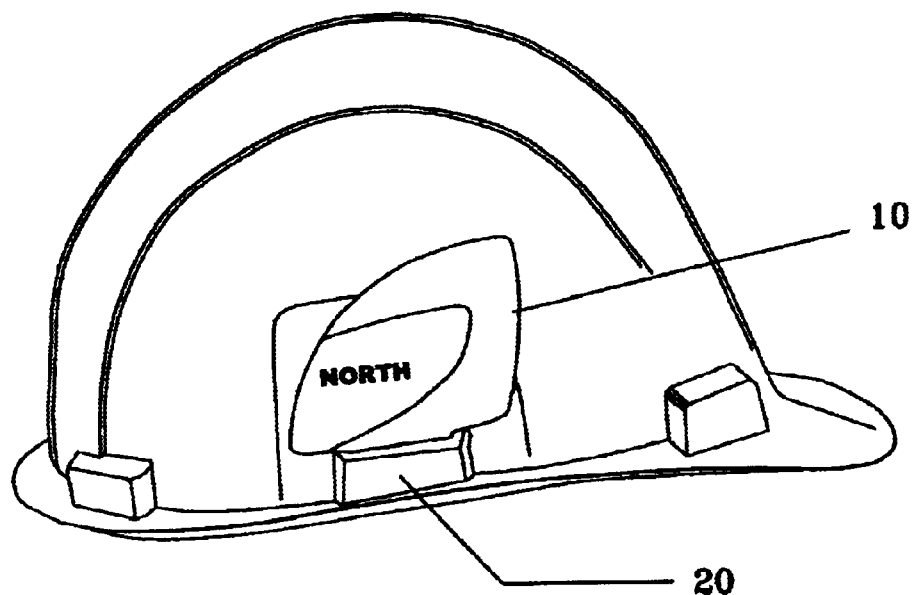
FIG. 4 is a side view of the clip of FIG. 1 inserted into a safety hat without supporting eyeglasses.

FIGS. 1, 2, 3, 4 and 5 show detailed views of the clip 10, taken from the side, top and front perspectives. FIG. 1 shows the clip 10 having the male wedge shaped securing piece or "prong" 11 at the bottom. This design shows a triangular shaped holder element (square, rectangular or other shaped holder elements may work equally as well in evolutionary designs) forming the top of the clip 18 used to secure the sun glass arm, and a soft foam, plastic insert or rubber grip pad 19 is additionally and optionally used to contact to the sunglass arm 16. FIG. 2 shows a top view of the clip 10, with rubber grip pad 19 and male prong 11. FIG. 3 shows left and right views of the clip 10. FIG. 4 shows the clip 10 in place on a safety hat inserted into the safety hat accessories receptacle 20.

Figure 5:
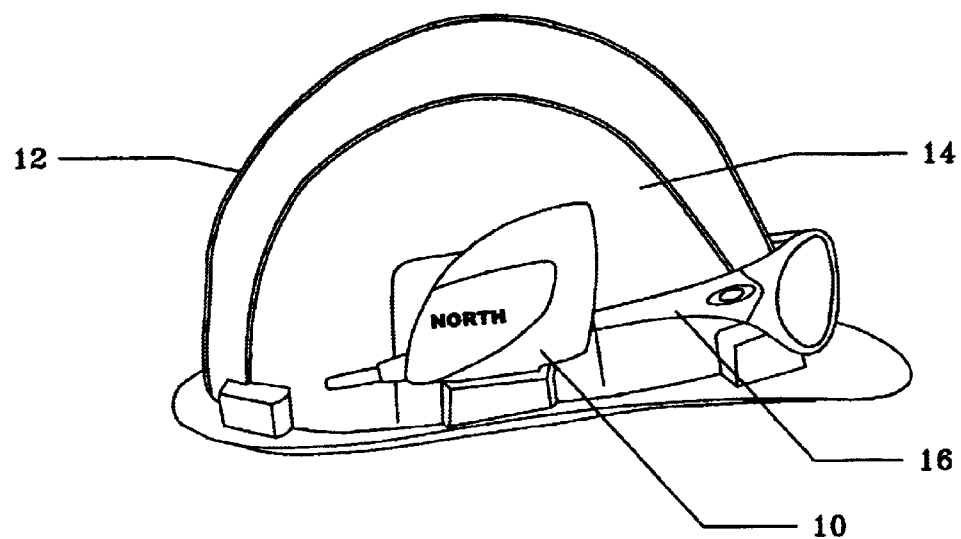
FIG. 5 is a side view of the clip of FIG. 1 inserted into a safety hat holding the arm of eyeglasses.

As shown at FIG. 5, the clip 10 is in place on a safety hat 12, securing a pair of eyeglasses 14.

Figure 6:
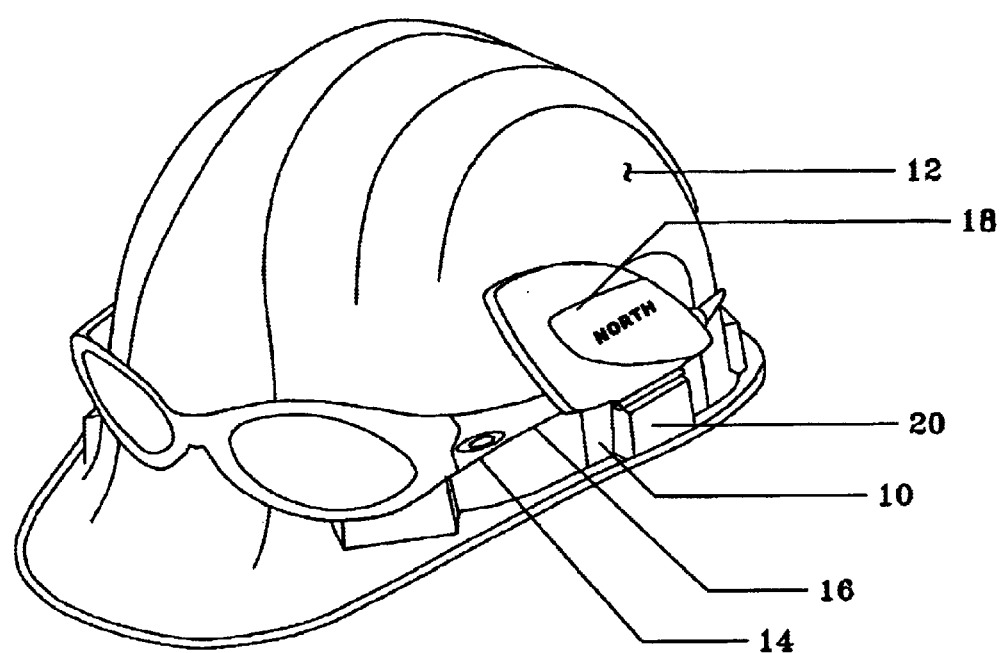
FIG. 6 is a perspective view of FIG. 1 in situ on a safety hard hat holding eyeglasses.

FIG. 6 generally illustrates the arrangement of a clip 10 disposed upon a safety hat 12 for holding safety or other types of eye glasses 14, which includes sun glasses.

The clip 10 supports eyeglasses 14 whereby the eyeglass arm 16 is held into place by the clip 10 at the clip top 18. A wedge shaped securing piece 11 secures the clip 10 in position by interference fit into the female accessories receptacle 20 on the side of the safety hat 12.

Figure 7:
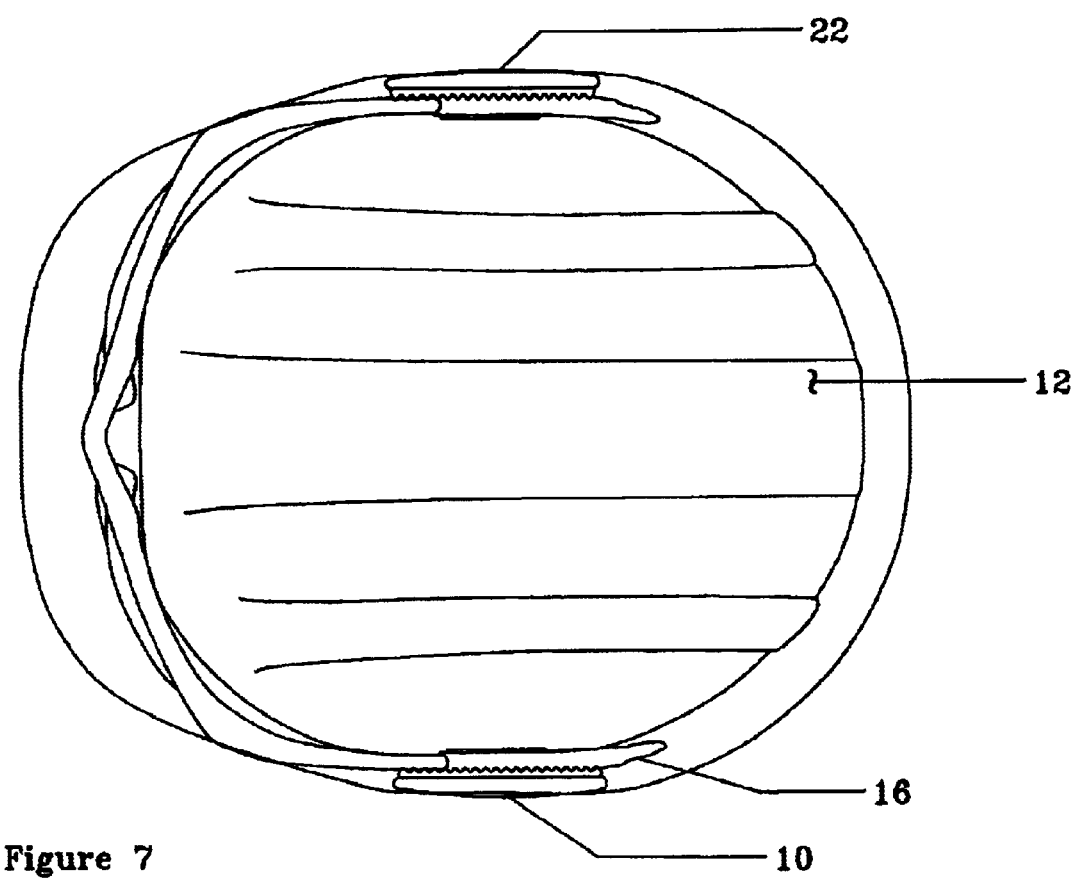
FIG. 7 is a top view of a pair of clips in situ on a safety hard hat holding eyeglasses.

FIG. 7 provides a top view of the clip 10 holding arm 16 against the hat 12 while the hat is on the head of the wearer. At least one clip 10 is needed to hold the glasses to the hat and two are preferred, 10 and 22.

A second embodiment of the non-removable holder may replace the pins and elastic chords with a spring on one side of the clip, which allows opening and closing the clip and with a force strong enough to hold the eyeglass legs in place snugly and securely against the hard hat.

Figure 1A:
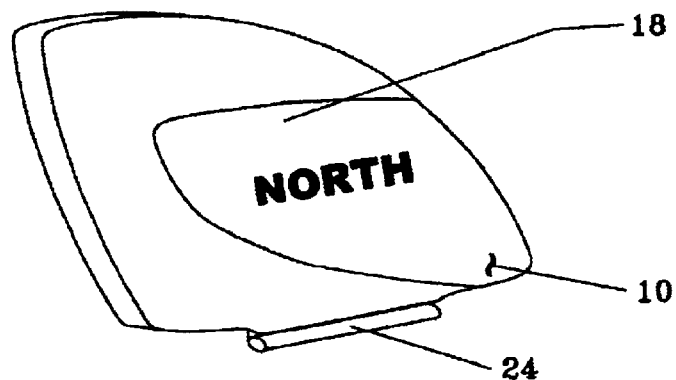
Figure 2A:
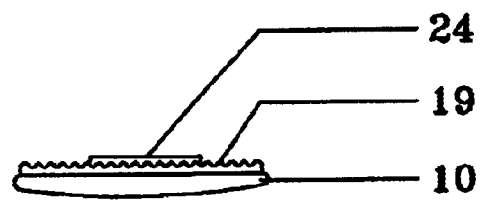
Figure 3A:
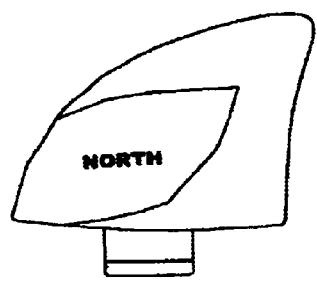
Figure 3A:
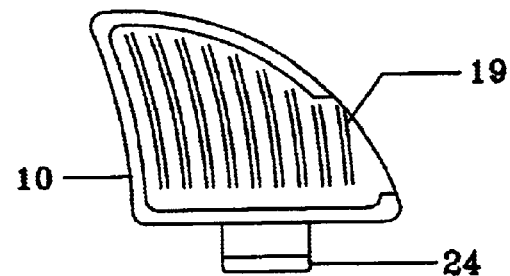

FIGS. 1A, 2A and 3A show detailed views of the non-removable clip 10 taken from the front perspective, top and side views. FIG. 1A shows the clip 10 having the same triangular shaped holder element as the removable hardhat clip forming the top of the clip 18 used to secure the eyeglass arm and a soft foam, plastic insert or rubber grip pad 19 is additionally and optionally used to contact the sunglass arm 16 (see FIG. 5) as well as a spring mechanism used to secure the clip 10 to a safety hat. FIG. 2A shows a top view of the clip 10, with the rubber grip pad 19 and spring mechanism 24. FIG. 3A shows left and right views of the invention.

These clips and holders are designed primarily for use on safety hats, but can be used on a variety of hats, such as baseball hats, cowboy hats, ski hats, and even scuba hoods. Any of a variety of hats can be used within the scope of this invention, soft hats, hats with hard brims, hat without brims, and hats with partial brims.

As will be apparent to those of ordinary skill in the art, various modifications or enhancements of the invention may be implemented without departing from the broader spirit and scope of the invention as described herein.

What is claimed is:

1. A clip attachable to a safety hat for supporting and securing eye glasses having at least one arm, comprising:

a clip removably engageable with a hat, wherein said clip comprises:
   a. a substantially planar member forming the frame of the clip, wherein said planar member may be triangular, square rectangular, or other geometric shape with a curvature forming an aperture for engaging the arm of eyeglasses;
   b. a wedge shaped male member extending normally from the substantially planar member engaging an aperture on the safety hat; and
   c. a rubber or foam grip insert disposed as a ribbed member for resiliently engaging the arm of the eyeglasses.

2. The clip of claim 1, wherein the insert is selected from the group consisting of soft foam or soft plastic.

* * * * *